(12) United States Patent
Hertenstein

(10) Patent No.: US 8,245,188 B2
(45) Date of Patent: Aug. 14, 2012

(54) FLASH PRESENTATION MARKUP LANGUAGE (FLML) FOR TEXTUALLY EXPRESSING FLASH PRESENTATIONS

(75) Inventor: David Hertenstein, Carrollton, TX (US)

(73) Assignee: International Business Machines Corporation, Armonk, NY (US)

( * ) Notice: Subject to any disclaimer, the term of this patent is extended or adjusted under 35 U.S.C. 154(b) by 965 days.

(21) Appl. No.: 12/257,130

(22) Filed: Oct. 23, 2008

(65) Prior Publication Data

US 2010/0107138 A1   Apr. 29, 2010

(51) Int. Cl.
*G06F 9/44* (2006.01)
(52) U.S. Cl. ...................................................... 717/114
(58) Field of Classification Search .................... 717/114
See application file for complete search history.

(56) References Cited

U.S. PATENT DOCUMENTS

| 6,988,240 | B2 * | 1/2006 | Grober et al. | 715/234 |
| 7,039,643 | B2 * | 5/2006 | Sena et al. | 707/691 |
| 8,006,178 | B2 * | 8/2011 | Parsell | 715/236 |
| 2002/0116716 | A1 * | 8/2002 | Sideman | 725/91 |
| 2007/0094609 | A1 * | 4/2007 | Gilboa et al. | 715/762 |
| 2008/0016491 | A1 * | 1/2008 | Doepke | 717/104 |

FOREIGN PATENT DOCUMENTS

WO   0223478 A2   3/2002

OTHER PUBLICATIONS

Yang el al., "MPML-FLASH: A Multimodal Presentation Markup Language with Character Agent Control in Flash Medium", 2004, IEEE.*
Tsutsui et al., "MPML: A Multimodal Presentation Markup Language with Character Agent Control functions", 2000.*
Kushida et al, "Humanoid Robot Presentation through Multimodal Presentation Markup Language MPML-HR", Jul. 2005, AAMAS.*
Prendinger et al, "MPML:a markup language for controlling the behavior of life-like characters", Jan. 2004, Elsevier Ltd.*
"Moockblog: XFL: Flash's New Source Format," [online] Moock. org, Mar. 6, 2008, [retrieved Oct. 22, 2008], retrieved from the Internet, <http://www.moock.org/blog/archives/000269.html>.
Yang, Z., et al., "MPML-FLASH: a Multimodal Presentation Markup Language with Character Agent Control in Flash Medium," [Online] IEEE Xplore 2.5, Proc. 24th In'l Conf. on Distributed Computing Systems Workshops, Mar. 23-24, 2004, pp. 202-207, [retrieved Oct. 23, 2008], retrieved from the Internet, <http://ieeexplore.ieee.org/xpl/absprintf.jsp?arnumber=1284032$page=FREE>.

* cited by examiner

*Primary Examiner* — Wei Zhen
*Assistant Examiner* — Junchun Wu
(74) *Attorney, Agent, or Firm* — Patents on Demand P.A.; Brian K. Buchheit; Scott M. Garrett

(57) ABSTRACT

A document written in a specialized FLASH presentation markup language (FLML) stored in a storage medium. Such a document can textually represent a FLASH presentation. The text can correspond to a FLAPRE markup language (FLML) that can be interpreted at run-time. The structure and syntax of the FLML can conform to a standardized markup language. The FLML document can include FLML tags having FLML attributes and FLML attribute values.

7 Claims, 2 Drawing Sheets

100

Sample FLML Document 200

```
220 <FLAPRE fullscreen="true" backImg="pic.jpg">
  225 <Fsound file="tune.mp3" volume="100">
    230 <Fslide num="1" backColor="white" itemTrans="eachInEachOut">
      235 <Fitem type="text" font="Arial" x="250" y="250">
        240 <Fanimate type="fade" startX="200" startY="100"
              endX="300" endY="200" speedIn="1" speedOut="1" />

245 {
            <Ffilter type="bevel" shadColor="silver"
            blurX="5" blurY="5" quality="high" strength="100" />

<Ffilter type="dropShadow" color="black" blurX="5"
            blurY="5" quality="high" angle="45" strength="100" />
        }

250 Text for item here.
      255 </Fitem>

260 {
          <Fitem type="image" pixelSnapping="auto" x="450" y="150">
            <Fsound file="cat.mp3" volume="100" >
              itemImage.jpg
            </Fsound>
          </Fitem>
      }

265 {
          <Fitem type="video" autoPlay="true" x="250" y="150">
            myVideo.flv
          </Fitem>
      }

270 </Fslide>
  275 </Fsound>
280 </FLAPRE>
```

FLML Tags 205

FLML Attribute Value 215

FLML Attribute 210

FIG. 2

FLASH PRESENTATION MARKUP LANGUAGE (FLML) FOR TEXTUALLY EXPRESSING FLASH PRESENTATIONS

BACKGROUND

The present invention relates to the field of FLASH presentation encoding and, more particularly, to using an extensible markup language (XML) based encoding language for expressing FLASH presentations.

FLASH presentations are a popular medium for visually presenting a variety of content to an audience. However, the creation process for FLASH presentations often requires the author to have technical knowledge of the FLASH specification used to encode the presentation. Due to the technical nature of creating FLASH presentations, additional authoring tools are required to assist a user during the creation process, such as less technical user interfaces that provide a level of abstraction between the user's input and the FLASH language specification.

The result of the current FLASH presentation creation process generates a FLASH file having a .SWF extension, which is encoded in accordance with a FLASH specification. The user-input data about the FLASH presentation is stored in source files having a .FLA extension that the authoring tool compiles into the .SWF file. Since a .SWF file is compiled, a user is unable to modify the FLASH presentation without modifying the original source files and recompiling the .SWF file. Thus, a presenter having just the FLASH presentation file is unable to make "on-the-fly" changes without access to the authoring tool and source files.

Issues regarding versioning and authoring tool incompatibilities tend to arise should the presenter gain access to a secondary authoring tool to modify the FLASH presentation. Should the presenter open the .SWF file to attempt to examine its contents in the hopes of making the necessary modification, they are presented with an unreadable assemblage of code. Thus, the conventional approach for encoding FLASH presentations restricts the portability and flexibility of FLASH presentations.

BRIEF SUMMARY

One aspect of the present invention can include a document written in a specialized FLASH presentation markup language (FLML) stored in a storage medium. Such a document can textually represent a FLASH presentation. The text can correspond to a FLAPRE markup language (FLML) that can be interpreted at run-time. The structure and syntax of the FLML can conform to a standardized markup language. The FLML document can include FLML tags having FLML attributes and FLML attribute values.

Another aspect of the present invention can include a FLASH presentation markup language (FLML). The FLML can include FLML tags that describe a FLASH presentation. The FLML tags can be text-based and can conform to a standardized markup language. The FLML tags can be interpreted in a run-time environment to produce the FLASH presentation.

BRIEF DESCRIPTION OF THE SEVERAL VIEWS OF THE DRAWINGS

FIG. 2 illustrates a sample FLASH presentation markup language (FLML) document in accordance with an embodiment of the inventive arrangements disclosed herein.

DETAILED DESCRIPTION

Figure 1:
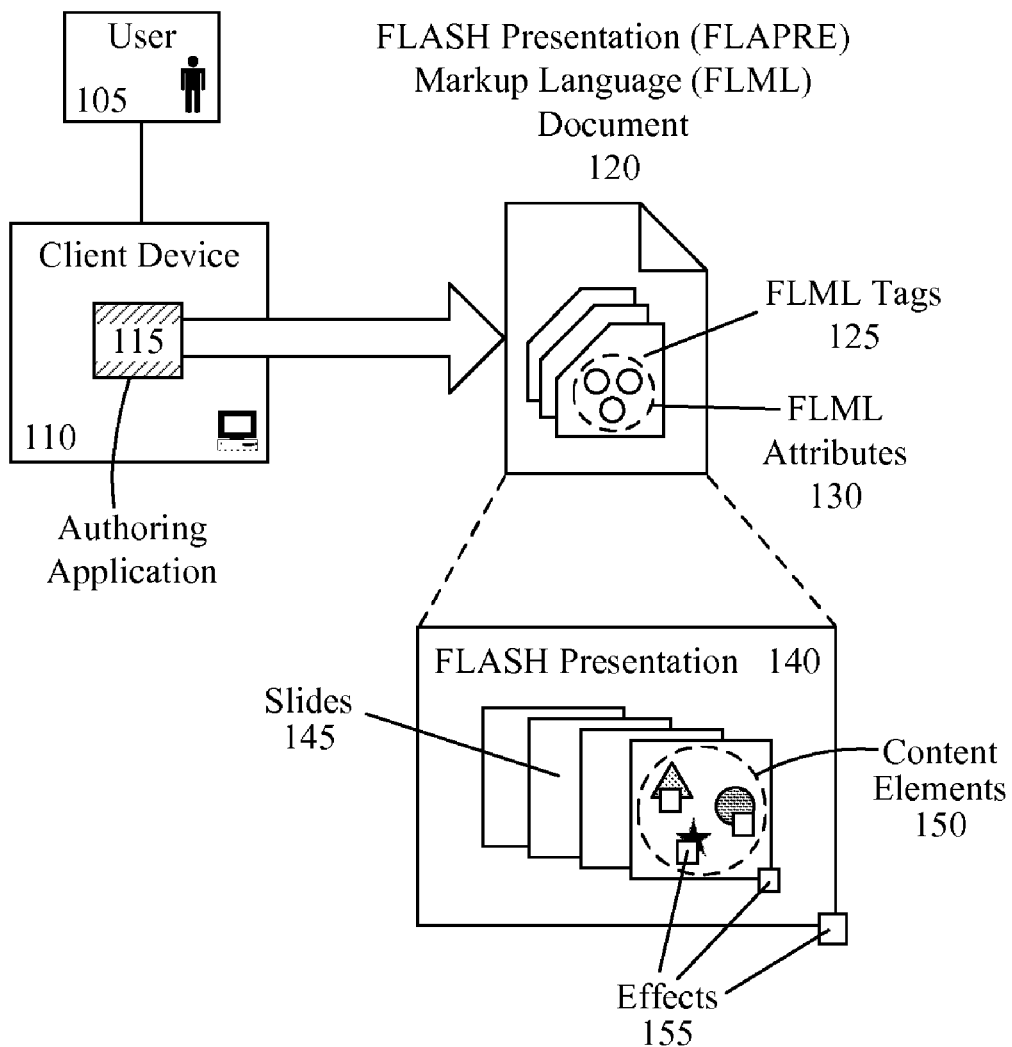
FIG. 1 is a schematic diagram illustrating a system that creates a FLASH presentation markup language (FLML) document in accordance with embodiments of the inventive arrangements disclosed herein.

The present invention discloses a FLASH presentation markup language (FLML) for representing a FLASH presentation in a text-based document. The FLML can include a variety of FLML tags, FLML attributes, and attribute values that conform to a standardized markup language like an Extensible Markup Language (XML). The FLML tags can be specialized to express the various content and behaviors found in a FLASH presentation, such as images and animation. The FLML document can be created and/or modified by a specialized FLML tool or text editor.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer usable storage medium having computer usable program code embodied in the medium. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. Examples of a computer readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer usable or computer readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a system 100 that creates a FLASH presentation markup language (FLML) document 120 in accordance with embodiments of the inventive arrangements disclosed herein. In system 100, a user 105 can utilize an authoring tool 115 operating on a client device 110 to create/modify a FLML document 120.

The FLML document 120 can be an electronic document that textually represents a FLASH presentation 140 using FLML tags 125 and FLML attributes 130. The FLML tags 125 and FLML attributes 130 can be standardized text strings that can be interpreted at run-time by an associated interpreter (not shown). The tags 125 and attributes 130 used in the FLML can be based upon a standardized markup language, such as an Extensible Markup Language (XML).

As such, the FLML document 120 can follow the standardized structure and syntax of the standardized markup language. For example, FLML tags 125 can be arranged in a hierarchical structure that contains an inherent precedence for tags 125 of the same type, as found in XML and HyperText Markup Language (HTML) documents.

Each slide 145, content element 150, and effect 155 that can be typically contained within a FLASH presentation 140 can be expressed within the FLML document 120 as specialized FLML tags 125 and FLML attributes 130. For example, a FLASH animation effect 155 can be denoted by a <Fanimate> tag 125 with attributes 130 that can define the type of animation effect and the speed at which the animation occurs.

The FLML document 120 can be produced by the authoring tool 115 operating on the client device 110, which can represent a variety of electronic computing devices. The authoring application 115 can representing a software application capable of performing standard text or FLML processing functions, such as a text editor or the FLAPRE authoring tool described in U.S. patent application Ser. No. 12/256,946 filed 23 Oct. 2008.

It should be noted that conventionally encoded FLASH presentation files, having a .SWF file extension, are of a compiled nature. This means that the slides 145, content elements 150, and effects 155 of the FLASH presentation 140 are contained in source files that are independent of the file containing the FLASH presentation 140. As such, modifications to a compiled FLASH presentation 140 require modification of the source files and recompilation before the change can be seen within the FLASH presentation 140.

Thus, it must be emphasized that the textual nature of the FLML document 120 provides a level of flexibility unavailable in the conventional encoding of FLASH presentations 140. The FLML document 120 can be edited by a variety of widely available software applications without concern of versioning conflicts between tools and/or FLASH language specifications or having access to the source files.

Further, changes made to a FLML document 120 can be immediately rendered by the interpreting application (not shown); the need for compiling/recompiling is eliminated. Additionally, the FLML tags 125 and attributes 130 can provide the user 105 with a readable expression of the FLASH presentation 140 that is lacking in the conventional encoding.

FIG. 2 illustrates a sample FLASH presentation markup language (FLML) document 200 in accordance with an embodiment of the inventive arrangements disclosed herein. The sample FLML document 200 can be created in the context of system 100. It should be noted that the contents of the sample FLML document 200 are for illustrative purposes only, and are not meant as a definitive implementation or a limitation in capabilities of the FLASH presentation markup language.

The sample FLML document 200 shown in FIG. 2 can illustrate a FLASH presentation markup language based upon the Extensible Markup Language (XML). The sample FLML document 200 can consist of multiple lines 220-280 of text that can contain FLML tags 205, FLML attributes 210, and FLML attribute values 215 defining a FLASH presentation.

The sample FLML document 200 can begin with line 220 containing a FLAPRE tag. The FLAPRE tag can be used to designate the beginning of the sample FLML document 200, similar to an <XML> tag or <HTML> tag. In this example, the FLAPRE tag includes two FLML attributes defining that the FLASH presentation is to be presented in a full screen mode with the file "pic.jpg" used as a background image.

In line 225, a Fsound tag can be used to indicate the use of a sound file for the FLASH presentation. Attributes defining the location of the sound file, "tune.mp3", and the volume at which to play the sound file can be included within the Fsound tag.

Line 230 can represent the beginning of a slide of the FLASH presentation with use of a Fslide tag. In this example, the Fslide tag includes three FLML attributes defining that the slide is first in the FLASH presentation, has a white background color, and the items of the slide transition on an "eachInEachOut" basis.

An item of data can be indicated in line 235 with the Fitem tag. A TYPE attribute can be used to further define the data that will be presented. Additional attributes can be contained within the Fitem tag to define properties associated with the specified type. As shown in this example, the item is a text string of the ARIAL font to be displayed within the viewing area of the FLASH presentation at the XY coordinates of (250, 250).

The Fanimate tag of line 240 can define an animation behavior for the text item defined in line 235. The attributes of the Fanimate tag can provide the specific details for the animation. In this example, the animation is to fade the text in at a position of (200, 100) with a speed of "1" and out at a position of (300, 200) with a speed of "1".

It should be noted that FLML tags 205 can utilize the standard syntax of including a tag termination character, such as a slash ("/"), in lieu of a separate ending tag, as shown in the Fanimate tag of line 240. However, it should be emphasized that such practice should be limited to self-contained FLML tags 205 such as Fanimate and not FLML tags 205 used to provide a containment structure such as the FLAPRE tag.

Line 245 is a grouping of two Ffilter tags for the text item defined in line 235. The Ffilter tag can define a filter effect. As shown in this example, each Ffilter tag defines a different filter effect for the same item, a bevel effect and a drop shadow effect.

The text string to be presented for the item defined in line 235 can appear in line 250. Line 255 can contain a closing tag for the Fitem tag opened in line 235. All attributes defined in the opening Fitem tag of line 235 as well as any other effect tags encapsulated by the opening and closing Fitem tags 235 and 255, such as the Fanimate tag of line 240 and the Ffilter tags of line 245, can be applied to the text string 255 when the sample FLML document 200 is rendered by an interpreting application.

The grouping of FLML tags 205 contained within line 260 can define a second item of data to be presented in the same slide of the FLASH presentation. In this example, the tags 205 of line 260 define the display of an image with an associated sound, "cat.mp3".

It should be noted that the Fsound tag defined in line 260 will override the general Fsound tag defined for the whole presentation in line 225 due to the structuring of the FLML tags 205 in the sample FLML document 200. Further, the Fsound tag of line 260 only applies to the Fitem in which it is encapsulated.

The grouping of FLML tags 205 contained within line 265 can define a third item of data to be presented in the same slide of the FLASH presentation. In this example, the tags 205 of line 265 define the display of a video file "myVideo.flv". The FLML tags 205 of lines 270-280 can terminate their corresponding tags of lines 230, 225, and 220, respectively.

In recap, the sample FLML document 200 of FIG. 2 textually defines a FLASH presentation having a background sound and one slide with a white background. The slide contains three items of data: a text string, an image, and a video. Presentation of each item of data appears with an "eachInEachOut" animated transition. The text string has an additional fade animation and two filter effects. The image includes a separate sound when presented.

The diagrams in FIGS. 1-2 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A document written in a specialized FLASH presentation markup language (FLML) stored in a non-transitory computer readable storage medium comprising: a run-time interpreted FLASH presentation (FLAPRE) document configured to represent a FLASH presentation with a plurality of text corresponding to a FLAPRE markup language (FLML), wherein structure and syntax of said FLML conforms to a standardized markup language, and, wherein the FLML document comprises a plurality of FLML tags having FLML attributes and FLML attribute values; the FLML tags defining boundary points of a slide within the FLASH presentation, wherein a presentation order of slides within the FLASH presentation is based upon a FLML attribute value of a corresponding FLML attribute contained within a FLML tag defining a beginning boundary of the slide; the slide is contained in source files that are independent of the file containing the FLASH presentation; and the FLASH presentation requires change of the source files and recompilation before the change can be seen within the FLASH presentation.

2. The FLML document of claim 1, wherein the standardized markup language is an Extensible Markup Language (XML).

3. The FLML document of claim 1, further comprising: a pair of FLML tags defining boundary points of the FLML document, wherein a starting boundary point tag appears at a beginning of the FLML document and an ending boundary point tag appears at an end of the FLML document.

4. The FLML document of claim 1, further comprising: a pair of FLML tags defining boundary points for a sound file to be played within the FLASH presentation.

5. The FLML document of claim 1, further comprising: a pair of FLML tags defining boundary points for a content item to be presented within the FLASH presentation, wherein said content item comprises at least one of a text string, a video, and an image.

6. The FLML document of claim 5, further comprising: a FLML tag defining a FLASH animation behavior for the content item; and a FLML tag defining a filter effect for the content item.

7. The FLML document of claim 1, wherein said FLML document is modifiable by at least one of a FLAPRE authoring tool and a text editor.

* * * * *